United States Patent
Lerch et al.

(10) Patent No.: US 7,119,690 B2
(45) Date of Patent: Oct. 10, 2006

(54) IDENTIFICATION BAND USING SERPENTINE PATHS TO DETECT TAMPERING

(75) Inventors: John W. Lerch, Indialantic, FL (US); Joshua M. Girvin, Indialantic, FL (US); John P. Norair, Indialantic, FL (US); Peijen S. Mou, Indialantic, FL (US)

(73) Assignee: Proximities, Inc., Melbourne, FL (US)

( * ) Notice: Subject to any disclaimer, the term of this patent is extended or adjusted under 35 U.S.C. 154(b) by 0 days.

(21) Appl. No.: 11/048,114

(22) Filed: Feb. 1, 2005

(65) Prior Publication Data

US 2006/0077060 A1    Apr. 13, 2006

Related U.S. Application Data

(60) Provisional application No. 60/617,518, filed on Oct. 8, 2004.

(51) Int. Cl.
*G08B 13/12* (2006.01)
*G08B 23/00* (2006.01)

(52) U.S. Cl. ............... 340/572.1; 340/572.8; 340/572.9; 340/568.2; 340/568.4; 340/573.4

(58) Field of Classification Search ............ 340/568.2, 340/568.4, 572.1, 572.8, 572.9; 40/633; 235/491; 292/307 R
See application file for complete search history.

(56) References Cited

U.S. PATENT DOCUMENTS

| 5,032,823 | A | * | 7/1991 | Bower et al. ............ 340/572.8 |
| 5,448,846 | A | | 9/1995 | Peterson et al. |
| 5,457,906 | A | | 10/1995 | Mosher, Jr. |
| 5,627,520 | A | * | 5/1997 | Grubbs et al. ........... 340/572.1 |
| 5,627,720 | A | | 5/1997 | Grubbs et al. |
| 5,883,576 | A | | 3/1999 | De La Huega |
| 5,973,598 | A | * | 10/1999 | Beigel .................... 340/572.1 |
| 5,973,600 | A | | 10/1999 | Mosher, Jr. |
| 5,977,877 | A | | 11/1999 | McCulloch et al. |
| 5,979,941 | A | | 11/1999 | Mosher, Jr. et al. |
| 6,043,746 | A | | 3/2000 | Sorrells |
| 6,050,622 | A | * | 4/2000 | Gustafson .............. 292/307 R |
| 6,211,790 | B1 | * | 4/2001 | Radomsky et al. ...... 340/573.4 |
| 6,236,319 | B1 | * | 5/2001 | Pitzer et al. ............ 340/573.4 |
| 6,255,951 | B1 | | 7/2001 | De La Huega |
| 6,346,886 | B1 | | 2/2002 | De La Huega |
| 6,421,013 | B1 | | 7/2002 | Chung |
| 6,782,648 | B1 | | 8/2004 | Mosher, Jr. |
| 6,888,509 | B1 | * | 5/2005 | Atherton .................. 343/718 |
| 2002/0067264 | A1 | | 6/2002 | Soehnlen |
| 2002/0084904 | A1 | | 7/2002 | De La Huega |

(Continued)

*Primary Examiner*—Jeffery Hofsass
*Assistant Examiner*—Anne V Lai
(74) *Attorney, Agent, or Firm*—Hamilton, Brook, Smith & Reynolds, P.C.

(57) ABSTRACT

A tamper-resistant RFID wristband that becomes permanently disabled upon tampering. The wristband includes a plurality of holes for snugly securing the band to a wearer, an RFID circuit, and an electrically conductive loop disposed in the band. The RFID circuit and the conductive loop are electrically coupled to form a series circuit, severance of which disables the wristband. The electrically conductive loop includes a first layer and a second layer that are electrically isolated from one another, save for at least one electrical connection made preferably by a via at the end of the band distal from the antenna element. The first layer encircles the holes in a serpentine path on one layer of the band and the second layer encircles the holes in a complimentary serpentine path on a different layer of the band.

18 Claims, 7 Drawing Sheets

U.S. PATENT DOCUMENTS

| | | |
|---|---|---|
| 2003/0075608 A1 | 4/2003 | Atherton |
| 2003/0173408 A1* | 9/2003 | Mosher et al. .............. 235/492 |
| 2004/0066296 A1 | 4/2004 | Atherton |
| 2006/0097870 A1* | 5/2006 | Choi et al. ............... 340/572.1 |

* cited by examiner

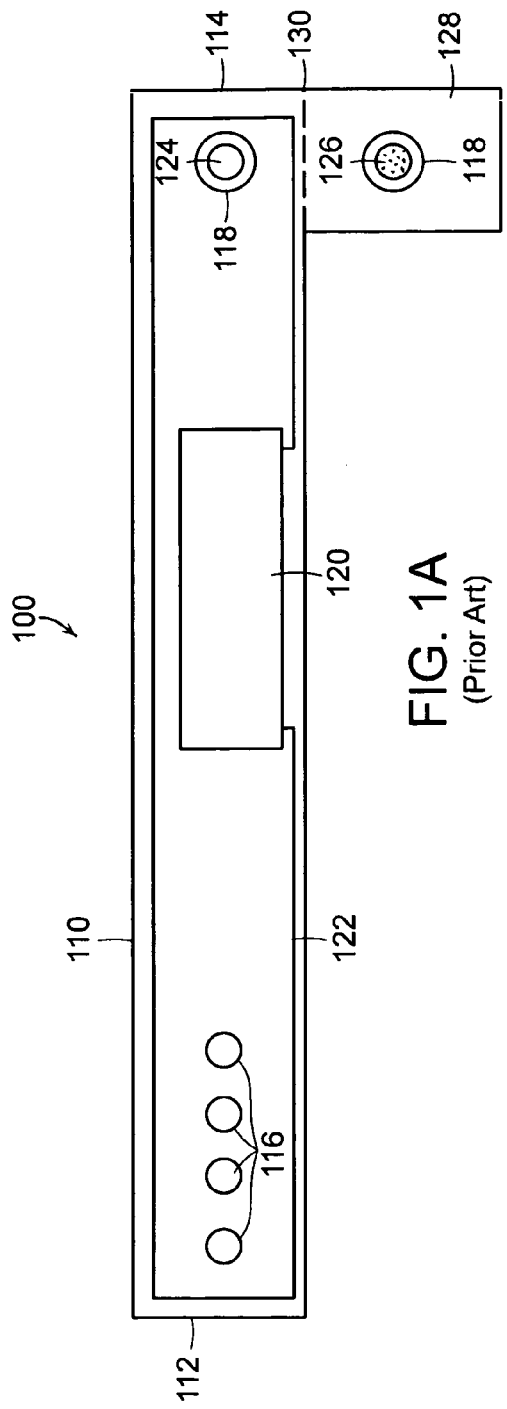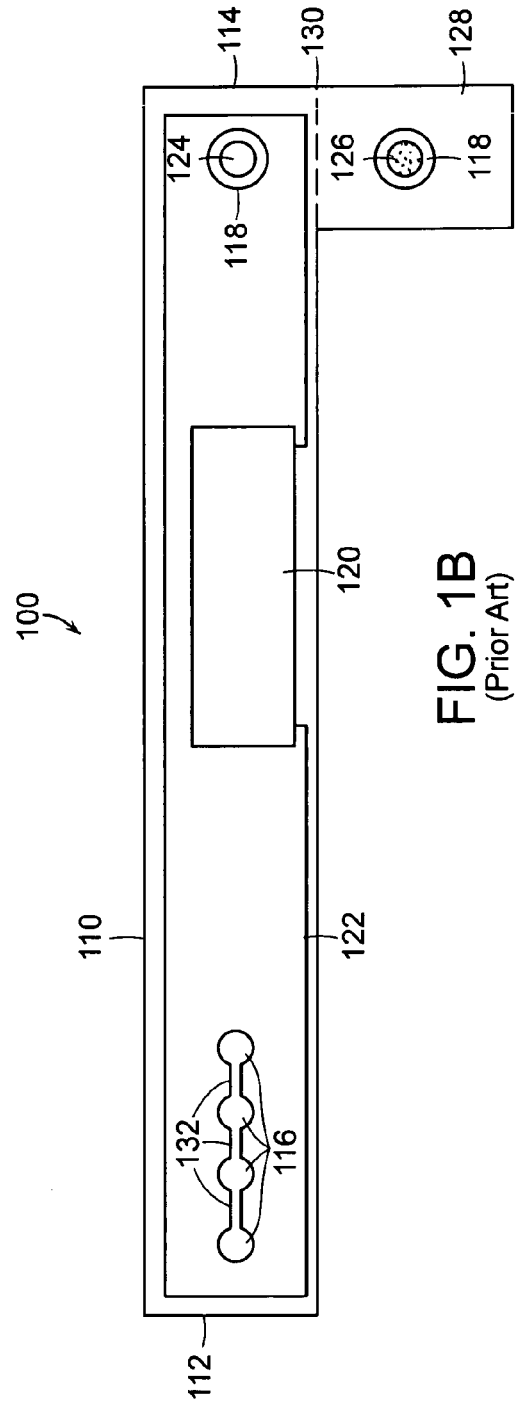

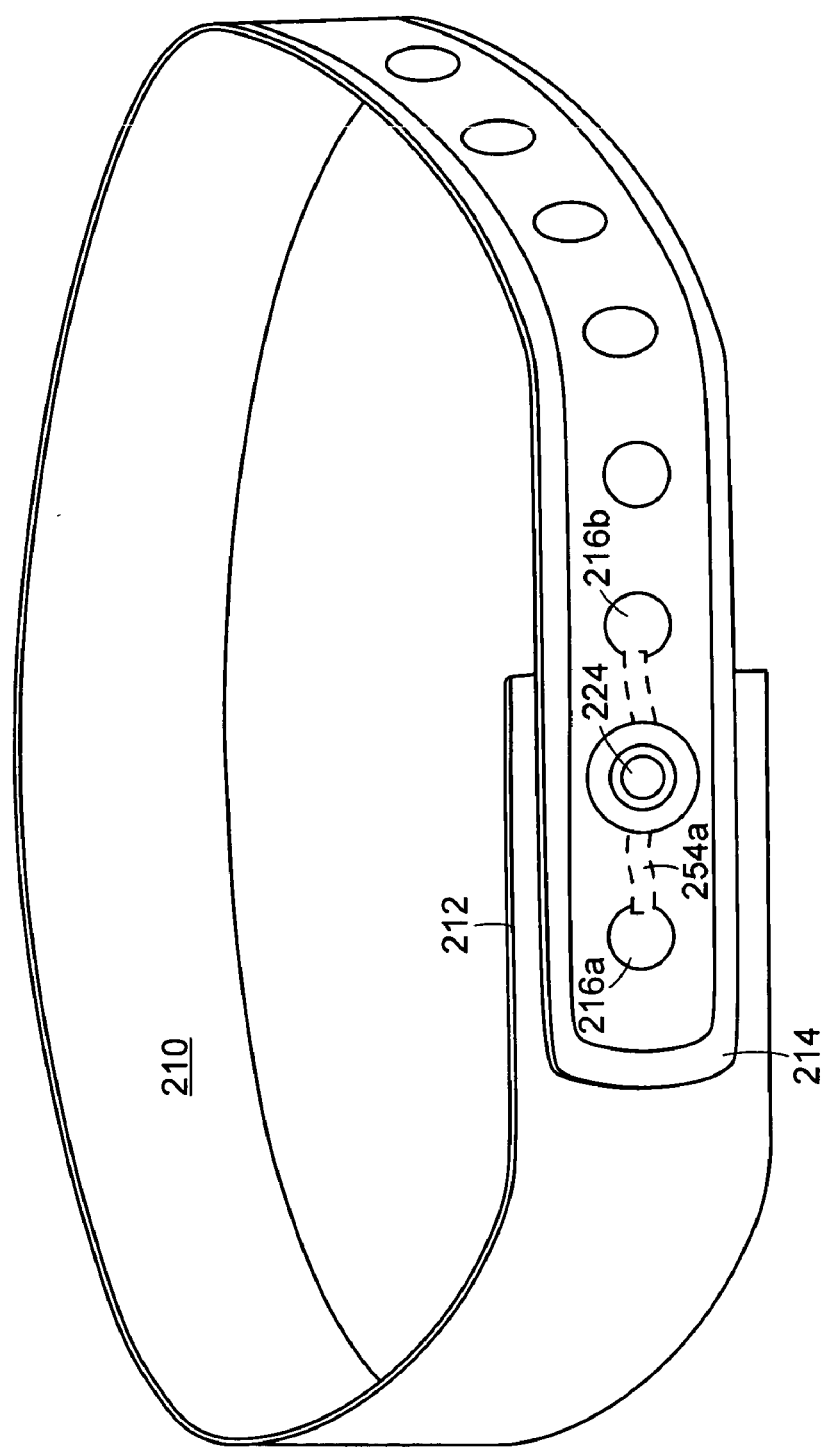

IDENTIFICATION BAND USING SERPENTINE PATHS TO DETECT TAMPERING

RELATED APPLICATION

This application claims the benefit of U.S. Provisional Application No. 60/617,518, filed on Oct. 8, 2004, the entire teachings of which are herein incorporated by reference.

BACKGROUND OF THE INVENTION

Bracelets have been used for such things as identification, access control, and age verification for a number of years. For example, various venues may use identification bracelets to quickly and uniquely identify patrons that have access to restricted areas, such as back stage events, alcoholic beverage sales, etc. These bracelets are most often made to be disposable, so that they are inexpensive to produce and easy to use. However, such bracelets are susceptible to misuse and unauthorized use. Some bracelets are easy to remove, yet still function after removal. A bracelet that still serves its purpose after it has been removed provides the opportunity for patrons to exchange and or sell bracelets. This could provide patrons with the opportunity to give access to a restricted area to an unauthorized patron. For example, a patron with an "adult" bracelet that allows access to alcoholic beverage sales could be removed and given or sold to a patron not of legal drinking age.

A number of mechanical measures have been taken to prevent such bracelets from being transferred. Most prominent is the use of a single-use locking mechanism found on some plastic bracelets. Also known are adhesive locking mechanisms with slits that prevent the wearer from peeling the adhesive back and reattaching it. These mechanisms render tampering with the locking device obvious to a visual inspection of the bracelet and, in most cases, render the bracelet unwearable after removal. However, tampering with the band portion of the bracelet is not prevented by these mechanisms, nor is the bracelet rendered otherwise inoperative if these mechanisms are tampered with. It is possible for the bracelet to be cut or torn, and reattached with a simple piece of transparent tape. To detect this sort of tampering, the person checking the bracelet would need to either make a full visual inspection of the bracelet or tug very firmly on the bracelet. This is slow, inconvenient, and impractical, especially when large numbers of people require identification. Furthermore, such a visual inspection is subject to human error, the most obvious being the failure of the bracelet checker to perform an adequate inspection.

To enhance the capabilities of these bracelets, additional technologies such as bar codes and radio-frequency identification (RFID) have been integrated into the bracelets. The use of such technologies has made the process of identifying the bracelet wearer faster and more secure, resulting in an increased use of bracelets for identification purposes and additional uses for bracelets, such as for facilitating transactions. However, this can lead to complacency among those responsible for checking the bracelets, and has a tendency to reduce the likelihood that the person checking the bracelet wearer will perform an adequate visual or physical inspection.

SUMMARY OF THE INVENTION

A bracelet that is rendered non-functional after removal destroys its value for transfer to another patron and safeguards against unauthorized use of the bracelet. The present invention thus provides a tamper-resistant RFID apparatus that becomes permanently disabled upon tampering. The apparatus includes a band of material, an RFID circuit, and an electrically conductive loop disposed in the band. The RFID circuit and the conductive loop are electrically coupled to form a series circuit. The band of material is such that any severance thereof to remove the band also necessarily disables the RFID circuit.

In one preferred embodiment, the band has a series of holes formed therein through which a corresponding peg is used to lock into a one of the holes to secure the band to a wearer. An electrically conductive loop formed in the band includes a first conductive path formed on a first surface of the band, and a second conductive path formed on a second surface of the band. The conductive paths are electrically isolated from one another, save for at least one electrical connection made preferably by a conductive via between the two surfaces. The first layer encircles the holes in a serpentine path on the first surface of the band and the second layer encircles the holes in a complimentary serpentine path on the second surface of the band.

The RFID circuit can include both an RFID transponder chip and an antenna element. In such a configuration, the conductive loop can provide a series connection between the RFID transponder chip and the antenna element.

The RFID transponder can be disposed on an end of the band that is distal from an end where the antenna element is disposed. Alternatively, the transponder can be disposed adjacent to the antenna element.

The antenna element can be a coiled antenna, in which case the.

The conductive paths can be arranged to together completely encircle each hole such that any attempt to cut or slit the band between adjacent holes necessarily also severs a portion of the conductive loop thereby disabling the RFID circuit.

While the present invention is described in the form of a wristband, it will be appreciated by those skilled in the art that the teachings herein are applicable in many other form factors and uses, such as for use as an ankle-band or on a piece of luggage.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1A shows a plan view of an RFID bracelet according to the prior art;

FIG. 1B shows a defeated RFID bracelet of FIG. 1A;

FIGS. 2A, 2B, and 2C illustrate a simple procedure for defeating the prior art;

DETAILED DESCRIPTION OF THE INVENTION

Figure 2A:
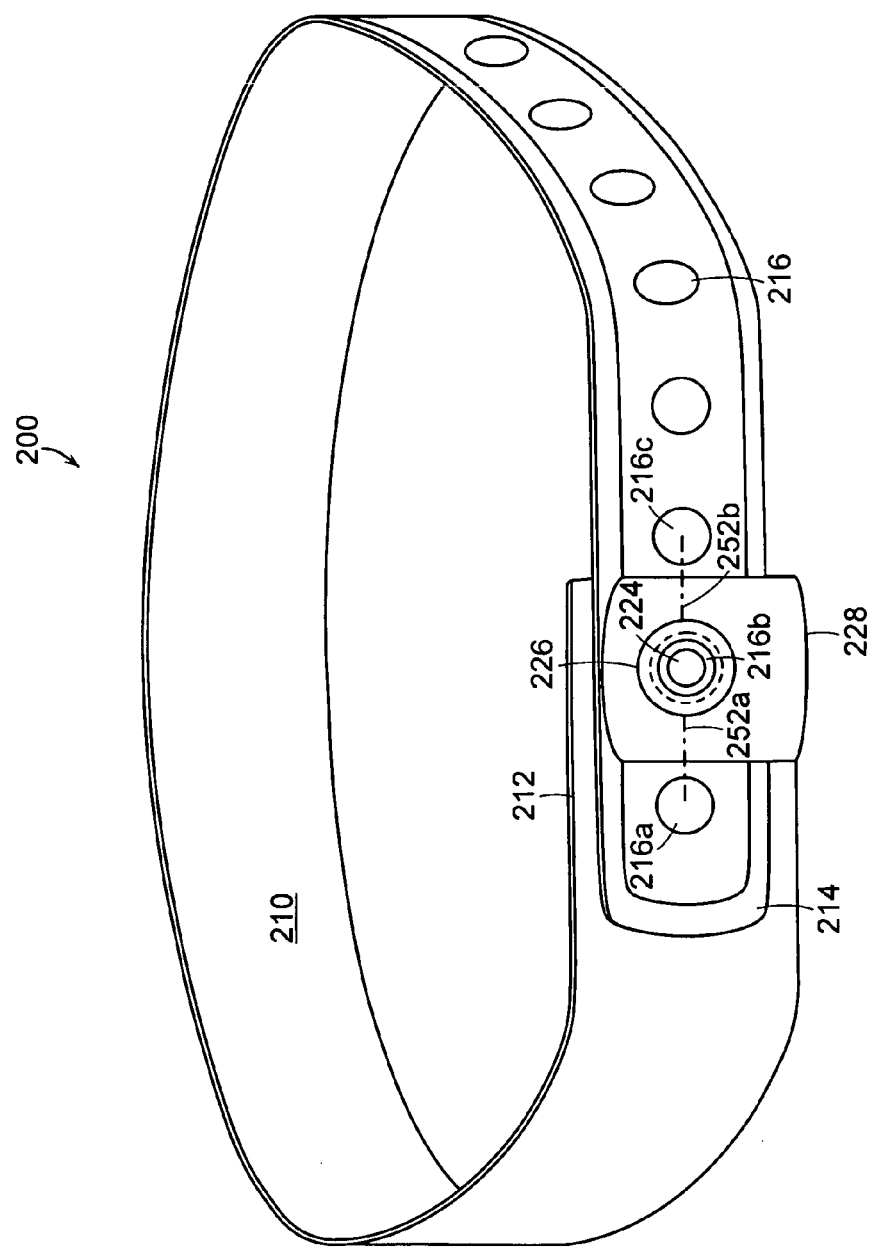

A description of preferred embodiments of the invention follows.

Generally, passive radio frequency identification (RFID) bracelets include circuits containing an antenna and other circuitry that responds to an RF interrogation signal. In response to the RF interrogation signal, a transponder emits an RF signal representative of information pre-stored or pre-programmed into the transponder. For example, the information could include a serial number, the date the bracelet is issued, the date the bracelet expires and will not longer be usable for access, the age status of the wearer, and/or whether the bracelet can be used for purchasing goods or services. Any other desired information, depending on the context in which the bracelet is to be used, may be pre-stored or pre-programmed in the transponder. Information stored on the transponder chip may also be used to access information stored in a database.

The transponder is electrically connected to and derives power from the antenna. The antenna is typically formed as a wire coil. In addition, a connection is made between the antenna and the transponder in the form of a continuous electrically conductive loop that extends around the wristband. Severance of any portion of the circuit will thus render the bracelet inoperable. Consideration should be given to the distance between the sections of the loop antenna that form the conductive loop in order to minimize inductance that can lead to possible interference with operation of the transponder and/or antenna.

FIG. 1A is a general illustration of a Radio Frequency Identification (RFID) bracelet 100 according to the prior art. The bracelet 100 is generally an elongated band 110 with opposite ends 112, 114 that can be brought together and fastened to form a closed loop. The band 110 includes a plurality of adjustment holes 116, a locking mechanism 118, a radio frequency identification (RFID) transponder circuit 120, and a tamper wire 122.

The RFID circuit 120 is electrically coupled to a tamper wire 122 which runs about the periphery of the band 110. The RFID circuit 120 will be rendered inoperative and the bracelet 110 rendered unusable if the tamper wire 122 is broken or severed. The locking mechanism 118 is a mechanical non-reusable tamper-resistant locking mechanism. For example, the locking mechanism 118 can be a barbed peg 124 and locking hole 126 in a flap 128. The locking mechanism 118 is used to fasten the opposite ends 112, 114 together under the flap 128 to form the closed loop as will be explained in more detail below.

The adjustment holes 116 are used to adjust the bracelet 100 to conform to body parts of different circumferences, e.g. a wrist or an ankle. When ends 112, 114 of the band 110 are brought together, the barbed peg 124 is inserted through a selected hole 116 as required for a snug fit. The flap 128 is then folded along an imaginary line 130 and the barbed peg 124 is then passed through the locking hole 126. The barbed peg 124 is shaped to resist removal from the locking hole 126 without also destroying the locking mechanism 118 and rendering it incapable of being refastened.

As shown in FIG. 1B, this design is easily tampered with (defeated) to allow reuse of the band 110. A simple slit (cut) 132 can be made by slicing the band 110 material between the adjustment holes 116 without breaking or severing the tamper wire 122, after which the circumference of the band 110 can be expanded to a size greater than the circumference of the body part to which the band is attached. The band 110 can then be slid over the body part and removed from the wearer, at which time the band 110 can be given or sold to an unauthorized user.

Figure 2C:
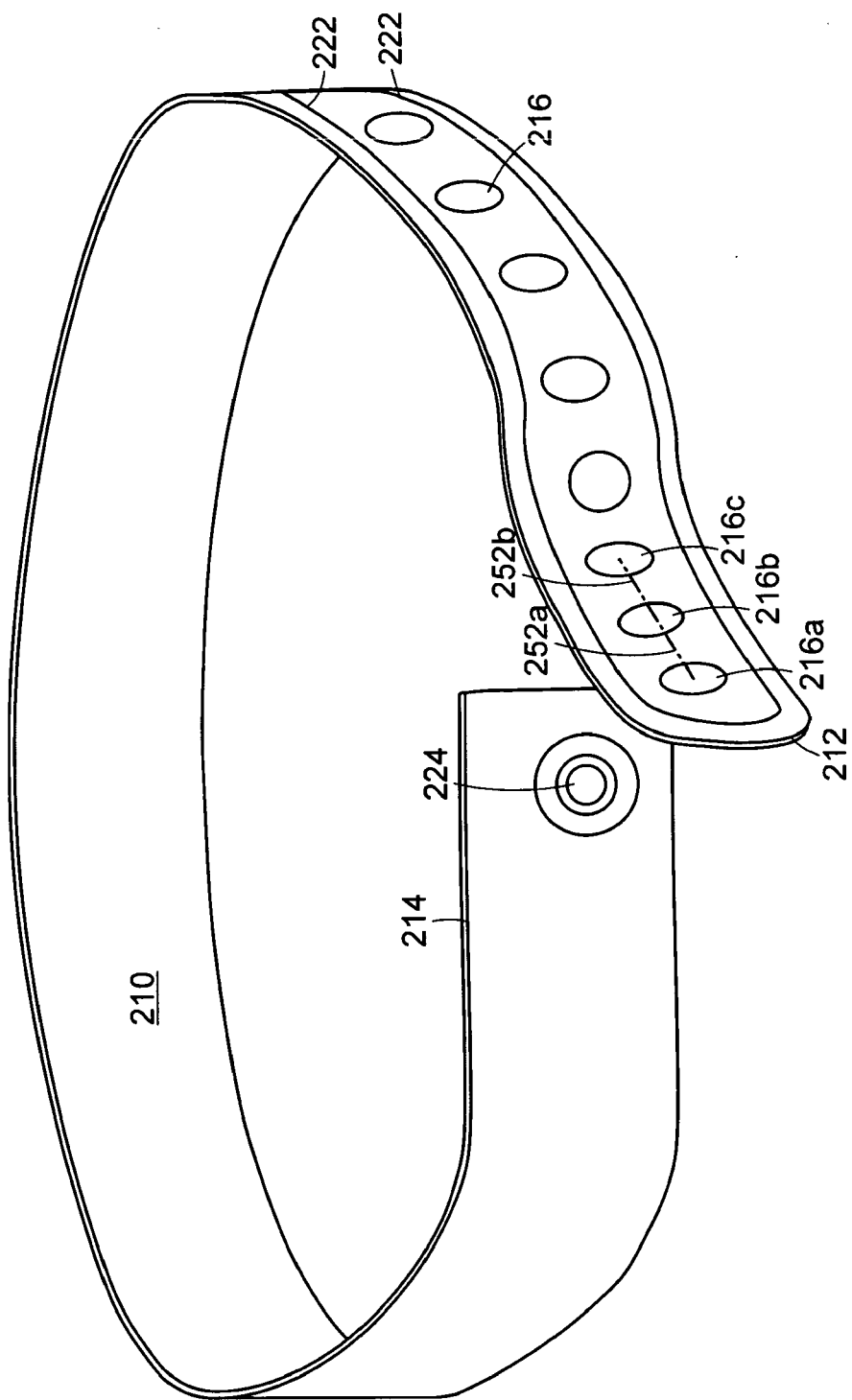

FIGS. 2A–2C illustrate an alternative way to defeat an RFID bracelet 200 of the prior art. The bracelet 200 connects in similar fashion as explained above. That is, when ends 212, 214 of the band 210 are brought together, a barbed peg 224 is inserted through a selected adjustment hole 216 as required for a snug fit. A flap 228 is then folded, as described above, and the barbed peg 224 is then passed through a locking hole 226. The barbed peg 224 is shaped to resist removal from the locking hole 226. (Please note that the flap is not shown in FIG. 2B for the sake of clarity).

However, this design can also be easily defeated by taking cutting instrument and cutting a slit 252a between adjustment holes 216a and 216b without also cutting a tamper wire 222. The slit 252a creates a substantially enlarged space 254a through which locking peg 224 can be slid. Given the preferred button-like form factor of the locking hole 226, the space 254a provided between adjustment holes 216a and 216b and slit 252a enables locking peg 226 to be slid through the band material 210. The process is similar to that used to unfasten a button on a dress shirt. An additional slit 252b can be made between adjustment holes 216b and 216c to provide an additional space 254b for removing the locking hole 226.

Such methods for defeating the prior art will be successful even in designs where the tamper wire 222 is provided to closely encircle the adjustment holes 216.

Figure 3A:
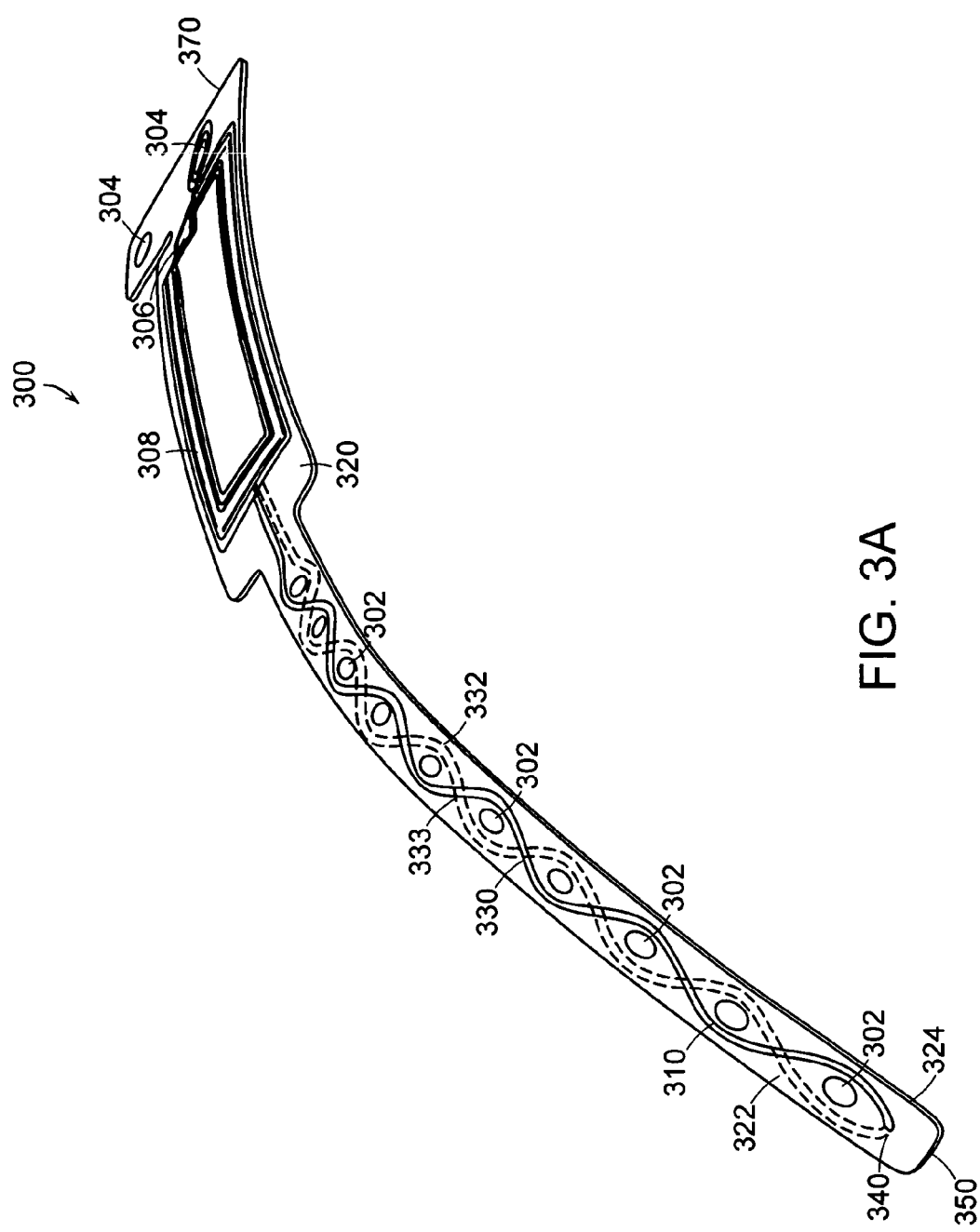
FIG. 3A shows a perspective view of an RFID bracelet according to the principals of the present invention.
Figure 3B:
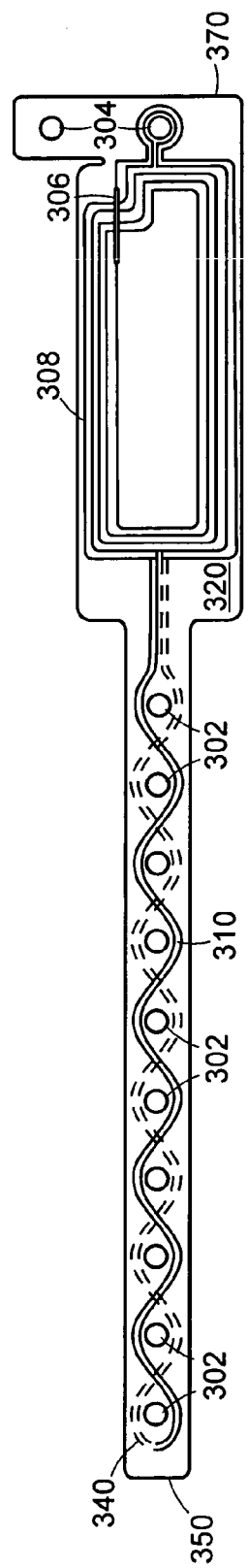
FIG. 3B shows a plan view of the bracelet of FIG. 3A.
Figure 3C:
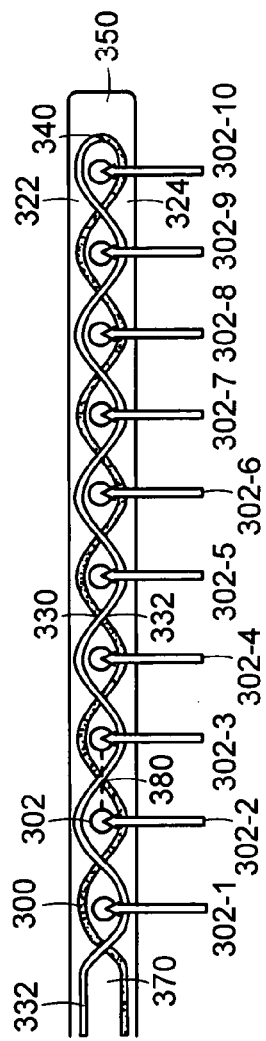
FIG. 3C shows a detailed view of the serpentine path followed by the conductive loop portions in the embodiment of of FIGS. 3A and 3B.

FIGS. 3A–3C illustrate a band 300 that prevents the aforementioned tampering. The band 300 includes a plurality of adjustment holes 302, a locking mechanism 304, a radio frequency identification (RFID) transponder chip 306, and an antenna element 308. The antenna element 308 is coupled to a conductive loop 310 that is configured on two or more electrically isolated layers of the band 300, save for at least one electrical connection made preferably by a conductive hole or "via" 340 located at a distal end 350 of the band 300. The conductive loop (traces) 310 weave around adjustment holes 302 in a serpentine fashion as illustrated. As described below in further detail, this arrangement ensures that the RFID function is disabled even when the band 300 is cut in a manner similar to that explained above.

The band 300 is formed of a substrate 320 of suitable material such as plastic, polymer, nylon, paper, Tyvek™ or other appropriate materials. (Tyvek is a trademark of E. I. du Pont de Nemours and Company for man-made materials.) The substrate 320 has at least an upper surface 322 and a lower surface 324. On the upper surface 322 is formed an upper conductive portion 330 of the conductive loop 310. Likewise, there is formed on the lower surface 324 a lower conductive portion 332 of the conductive loop 310.

A conductive hole or "via" 340 is formed at a distal end 350 of the band 300. The via 340 provides electrical conductivity between the upper conductive portion 330 and lower conductive portion 332 of the conductive loop 310. In this embodiment, the distal end 340 of the band 300 is the end farthest from the end of the band containing the RFID transponder chip 306 and antenna element 308.

One of skill in the art will recognize that conductive portions 330 and 332 could also be formed on a wristband that has a multi-layer substrate 320. In such an arrangement, the upper conductive portion 330 is formed on one layer of the substrate 320 and the lower conductive portion 332 is formed on another layer of the substrate 320.

The antenna element 308 and conductive loop 310 are preferably, but not necessarily, made from etched copper that is robust enough to withstand normal handling, but fragile enough that it will be broken if a user attempts to remove the bracelet.

Alternatively, the conductive loop 310 may be a printed conductive ink, a thin foil, or made by depositing other suitable electrically conductive material on one or more layers of the substrate 320 that will form an electrically continuous path but will break as a result of tampering.

The conductive loop 310 may also be formed from an insulated wire.

Forming the conductive loop 310 with frangible zones, where stresses from tampering attempts are most likely to occur, may facilitate breakage of the conductor. Of course, if the wearer attempts to remove the bracelet 310 with a cutting implement, the conductor forming loop 310 will also be severed as band 300 is severed.

In the illustrated embodiment, the upper conductive portion 330 and lower conductive portion 332 follow complimentary serpentine paths on their respective surfaces around the adjustment holes 302. With reference to FIG. 3C and following the upper conductive portion 330 (shown as the solid black trace), starting from the near end 370 on the left, upper conductive portion 330 first goes "above" a first hole 302-1 then passes between holes 302-1 and 302-2, then traveling "below" hole 302-2. Continuing to follow upper conductive portion 330, it then travels above hole 302-3, and then likewise below hole 302-4, continuing to travel above and then below any other remaining holes 302 in a serpentine path.

The lower conductive portion 332 (shown as the outline trace) follows a similar but complementary serpentine path around the holes 302. Thus, starting at the distal end 350, the lower conductive portion 332 first passes above hole 302-10 and then below hole 302-9. From there, it travels above hole 302-8 and likewise until terminating at the near end 370.

The conductive portions thus provide multiple points of overlap 333, located between the holes 302 where the upper conductive portion 330 runs over the lower conductive portion 332. However, the conductive portions are located on different surfaces 322, 324 of the non-conductive substrate 320. Thus, the two conductive portions 330, 332 remain electrically isolated from one another.

With this configuration, it is therefore impossible to slit (cut) the band 300 in any direction near any of the holes 320 without also slitting or cutting at least one of the conductive portions 330, 332 of the conductive loop 310.

This is true even if the slit is made in an exactly parallel direction with the major axis of the band 300 (e.g. along its length). Thus, for example, even if a cut is made such as shown by dashed line 380 in FIG. 3C, such a cut will necessarily also cut either the upper conductive portion 330 or the lower conductive portion 332, or both conductive portions 330, 332.

Although the serpentine design is shown to be on upper and lower surfaces 322, 324 of the substrate 320, one skilled in the art will appreciate that the design can be accomplished on a multiple layer band, with the conductive traces located on different material layers, as long as the conductive loop 310 does not become short circuited at the points 333 where the serpentine paths overlap between holes 302.

Figure 3D:
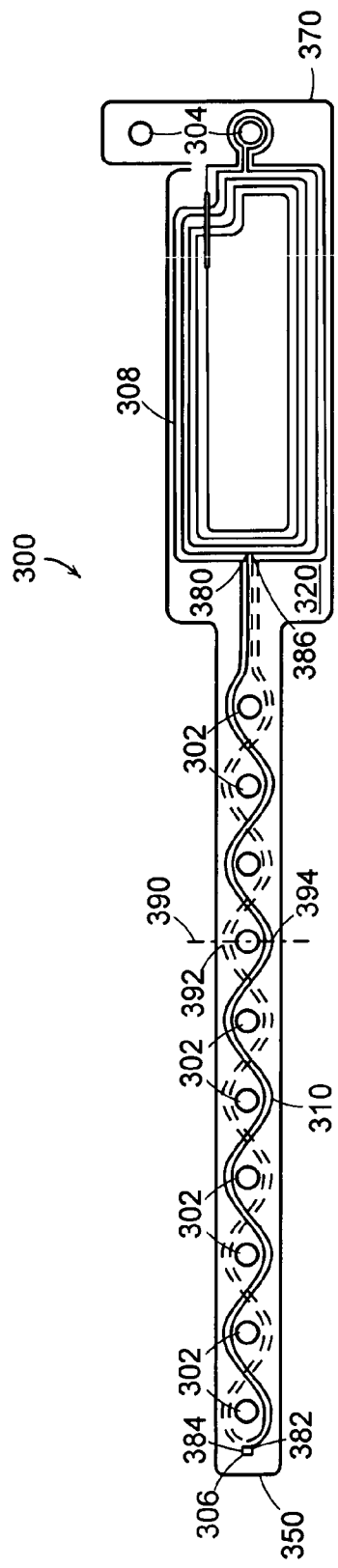
FIG. 3D shows a plan view of an embodiment of the invention where an RFID transducer chip is located distal from an antenna element.

To further ensure the RFID circuit becomes disabled without simply repairing the severed conductive loop 310, the RFID chip 306 can be placed distal from the antenna element 308, as shown in FIG. 3D. This embodiment provides an improvement over an arrangement where the RFID chip is located adjacent the coiled antenna section. In such a configuration, a simple cut of the band 300 anywhere away from the coiled antenna section 308 and/or adjacent RFID transponder chip 306 still permits the RFID transponder chip 306 and coiled antenna 308 to perform its RFID function.

In this configuration, the band 300 is arranged with the coiled antenna section 308 disposed on a surface of the band material 320 at the near end 370, in the drawing shown as the right end of the band 300. On an opposite or distal end 350 of the band 300 is mounted the RFID transponder chip 306. In this embodiment, the conductive loop 310 again runs in a serpentine path along the length of the band between the coiled antenna section 308 and the RFID transponder chip 306, similar to the loop shown in FIGS. 3A–3C. Namely, conductive loop 310 includes an upper conductive portion 330 and a lower conductive portion 332 formed on respective surfaces of the band.

The upper conductive portion 330 runs from a first point or node 380 of the coiled antenna 308 along an upper surface 322 of the band 300, terminating at a first node 382 of the RFID transponder chip 306. The lower conductive portion 332 runs from a second node 384 of the RFID transponder chip 306 along a lower surface 324 of the band 300 back to a second node 386 of the coiled antenna 308. The RFID transponder chip 306 provides the electrical connection between the upper and lower surfaces 322, 324 of the band 300.

This configuration also provides protection against an attempt to repair a cut band as follows. Consider a situation where a cut is made on an imaginary line 390 perpendicular to a major axis of the band 300. If one then attempts to repair the band 200 by rejoining the two pieces by simply laying a piece of tin foil between the two points 392 and 394, the attempted repair merely results in shorting out the connection between the coiled antenna section 308 and the RFID transponder chip 306, rather than re-establishing a connection between them.

While this invention has been particularly shown and described with references to preferred embodiments thereof, it will be understood by those skilled in the art that various changes in form and details may be made therein without departing from the scope of the invention encompassed by the appended claims.

What is claimed is:

1. A tamper-resistant RFID identification apparatus, comprising:
   a band;
   an RFID circuit disposed on the band;
   an electrically conductive loop disposed on the band and electrically coupled to the RFID circuit, and also arranged to disable the RFID circuit when cut, wherein the conductive loop also overlaps itself at at least one overlap point; and
   an insulating material disposed between the portions of the conductive loop at the at least one overlap point;
   wherein the band includes a series of holes along a length thereof; and
   wherein the conductive loop is formed from a first and second conductive loop portion, wherein each conductive loop portion passes closely by a respective section of at least one hole such that the first and second conductive portions together substantially surround the at least one hole.

2. The identification apparatus of claim 1, wherein the conductive portions are arranged such that a slit made between adjacent holes in the band necessarily severs at least one conductive loop portion.

3. The identification apparatus of claim 1, wherein the first conductive loop portion loop passes closely by two or more holes in a serpentine path on at least one surface of the band and the second conductive loop portion passes closely by the same two or more holes in a complementary serpentine path on at least one different surface of the band.

4. The identification apparatus of claim 3, wherein the band is formed of multiple layers.

5. The identification apparatus of claim 4 wherein the first conductive loop portion is formed on one layer of the band and the second conductive loop portion is formed on a second layer of the band.

6. A method of making a tamper resistant RFID identification apparatus, comprising:
    providing a band with at least two surfaces, and having a series of holes along a length thereof;
    completely encircling the series of holes with a conductive loop disposed in the band, by forming a first conductive path passing closely by the holes on one surface of the band, and forming a second conductive path passing closely by the holes in a complimentary path on a second surface of the band; and
    disposing an RFID circuit in the band, such that the RFID circuit and the conductive loop are electrically coupled.

7. The method of claim 6, additionally comprising:
    forming a via for electrically coupling the first and second surfaces.

8. The method of claim 6, wherein the RFID circuit includes an RFID transponder chip and an antenna element.

9. The method of claim 8, wherein the RFID circuit is disposed on an end of the band that is distal from the antenna element.

10. The method of claim 9, wherein the conductive loop provides a series connection between the RFID circuit and the antenna element.

11. The method of claim 8, wherein the antenna element is a coiled antenna.

12. The method of claim 6, wherein the conductive loop encircles at least two holes such that a slit made between said at least two holes necessarily severs the conductive loop thereby disabling the RFID circuit.

13. The method of claim 6, further including a tamper-resistant locking mechanism for securing the band to a wearer.

14. The method of claim 13, wherein the locking mechanism includes: a peg located at one the band; and
    a socket located the same end of the band, the peg and socket cooperatively and securely attach to each other to securely engage one hole of the band.

15. The method of claim 6, wherein the conductive loop is formed on multiple layers.

16. A tamper-resistant RFID identification apparatus, comprising:
    a band having a series of holes along a length thereof;
    an RFID circuit disposed in the band;
    an electrically conductive loop disposed in the band and electrically coupled to the RFID circuit, wherein the conductive loop travels along the band in a path substantially surrounding at least two holes and creating at least one overlap point therebetween, wherein the loop is insulated at the loop overlap point.

17. The identification apparatus of claim 16, wherein the conductive loop is a wire.

18. The identification apparatus of claim 16, wherein the overlap point is insulated by an insulation provided on the wire itself.

* * * * *